Patented Jan. 24, 1950

2,495,285

UNITED STATES PATENT OFFICE 2,495,285

WAX AND POLYMERIC POLYKETONE COMPOSITIONS AND ARTICLES COATED THEREWITH

Harvey H. Hoehn, Hockessin, Del., assignor to E. I. du Pont de Nemours & Company, Wilmington, Del., a corporation of Delaware No Drawing. Application March 25, 1949, Serial No. 83,513

13 Claims. (Cl. 260—28.5)

This invention relates to new compositions of matter and methods for their preparation. More particularly this invention relates to new compositions of matter which are useful as coating compositions and to articles and substrates containing such compositions.

This invention has as an object to provide new compositions of matter. A further object is to provide new wax compositions and articles and substrates coated therewith. A still further object is to provide new wax compositions having superior properties. Other objects will appear hereinafter.

These objects are accomplished by providing new compositions comprising a wax and an ethylene/carbon monoxide polymeric polyketone in which the mole ratio of ethylene to carbon monoxide is from 150:1 to 5:1. This invention also includes articles and substrates treated with a blend of wax and an ethylene/carbon monoxide polymeric polyketone in which the mole ratio of ethylene to carbon monoxide is from 150:1 to 5:1.

The weight ratio of wax to ethylene/carbon monoxide polymeric polyketone may range from 1:99 to 99:1 and usually it is from 5:95 to 95:5. In view of the fact that the polymeric polyketone is usually the costlier component of the compositions, it is generally desirable to employ as large an amount of the less costly wax component as is possible. In the preferred compositions the amount of wax component will range from 25% to 90% by weight, that is a weight ratio of wax to ethylene/carbon monoxide polymeric ketone of 1:3 to 9:1.

The ethylene/carbon monoxide polymeric polyketones usefully employable in the practice of this invention are those in which the mole ratio of ethylene : carbon monoxide may range from 150:1 to 5:1. Preferred products, because of their excellent compatibility with paraffin hydrocarbon waxes are those in which the mole ratio of ethylene : carbon monoxide is from 8:1 to 50:1 and which have molecular weights of at least 1000.

The compositions of this invention may be made either by fusing together the ethylene/carbon monoxide polymeric polyketone and wax components until a homogeneous blend has been obtained, or by separately fusing the polymeric polyketone and wax and blending with agitation, or by dissolving the polymeric polyketone and wax in organic solvents and blending the solutions with agitation, or by dispersing the polymeric polyketone and wax in an aqueous medium and then blending the dispersions with agitation.

The polymeric polyketones used in the practice of this invention are the ethylene/carbon monoxide polymers prepared as described in the copending application of M. M. Brubaker, U. S. Serial No. 522,374, filed September 1, 1944, and now abandoned, of which Serial No 97,908, filed June 8, 1949, is a continuation-in-part. The ethylene/carbon monoxide polymeric polyketones prepared in accordance with the disclosure in the aforementioned Brubaker application are obtained by polymerizing carbon monoxide with ethylene in the presence of a polymerization catalyst, such as a peroxy compound or an azo compound.

A typical preparation of an ethylene/carbon monoxide polymeric polyketone usefully employable in the practice of this invention is the following:

A pressure reactor is swept free of air with deoxygenated nitrogen, charged with 3 parts of di(tertiary butyl) peroxide and 100 parts of cyclohexane, closed, and evacuated. The reactor is then placed in a heated shaker box and connected to a high pressure source of mixed gas containing 88% ethylene and 12% carbon monoxide. Ethylene/carbon monoxide mixed gas is expanded into the reactor to a pressure of 40 atmospheres, and heating and agitation are started. The temperature of the mixture is adjusted to 135° C. and maintained at 130° to 140° C. for 15 hours, during which time the pressure is adjusted to 133.3 atmospheres by repressuring with the ethylene/carbon monoxide gas mixture. The vessel is then permitted to cool, excess ethylene and carbon monoxide are bled off, and the vessel is opened. The reaction product comprises a mixture of carbon monoxide/ethylene polymeric polyketone and cyclohexane. The removal of the cyclohexane is accomplished by distillation. From the reaction mixture there is recovered 60 parts of a white, tacky, beeswax-like product melting at 60° to 95° C. and containing ethylene and carbon monoxide in a mole ratio of 5:1.

The examples which follow are submitted to illustrate and not to limit this invention. Parts are by weight unless otherwise stated.

Example I

Ethylene/carbon monoxide polyketones were blended with equal weights of paraffin, carnauba, or beeswax by heating together at 175° C. and stirring. The hot melt was examined for clarity, and then the solidified mixture was examined for evidence of nonhomogeneity. The results of these tests are given below.

| Polyketone | | | Compatibility of Blends | | | | | |
|---|---|---|---|---|---|---|---|---|
| E/CO Mole Ratio | Mol. Wt. | Melting Point, °C. | Paraffin | | Carnauba | | Beeswax | |
| | | | Hot | Cold | Hot | Cold | Hot | Cold |
| 36.4:1 | | 105-115 | clear | C | clear | C | clear | C |
| 19.2:1 | | 93-115 | slightly cloudy | C | do | C | slightly cloudy | C |
| 17.9:1 | 1,546 | 83-113 | clear | C | do | C | clear | C |
| 5.5:1 | 1,465 | 50-74 | cloudy | C | cloudy | C | cloudy | C |
| 12.4:1 | 1,639 | 78-97 | clear | C | clear | C | clear | C |
| 8.9:1 | 1,054 | 72-82 | cloudy | C | do | C | do | C |
| 7.4:1 | 2,094 | 71-105 | do | C | cloudy | C | cloudy | C |
| 7.5:1 | 2,759 | 75-99 | do | C | do | C | do | C |
| 9.4:1 | 5,720 | 98-115 | do | C | do | C | do | C |

E/CO mole ratio is the mole ratio of ethylene to carbon monoxide.
C means that the blend was completely compatible, i. e., that there was no evidence of phase separation.
"Cloudy" means that the blend was not clear due to the presence of small amounts of cross-linked polymeric polyketone. The blends, however, even though they are cloudy are nevertheless compatible for practical purposes such as the coating of paper.

Example II

A blend of equal parts of paraffin wax and a polyketone was made by stirring for 15 minutes at 100° C. in a Waring Blendor. The hot blend was poured into a mold to cool; no separation of the components occurred although a few particles of undispersed polyketone were observed. The polyketone used in this composition had an E/CO mole ratio of 11.2:1, a melt viscosity of 60 poises at 250° C. and a melting range of 58.4–96.2° C. Its molecular weight was about 2600.

Example III

Equal parts of microcrystalline wax and a polyketone were blended by melting and stirring. The polyketone had an E/CO mole ratio of 11:1, a molecular weight of 2900, and a melt viscosity of 360 poises at 125° C. Its melting range was 57–93° C. This blend was melt coated on paper and gave an attractive coating showing good heat sealability.

Example IV

An ethylene/carbon monoxide polymeric polyketone having an ethylene/carbon monoxide mole ratio of 9:1, characterized by being a hard, tough, translucent wax with a melt viscosity of 50 poises at 125° C., was melt blended in different ratios with paraffin wax having a melting point of 133–135° F.

| Property | Polyketone/Wax Ratio | | | | |
|---|---|---|---|---|---|
| | 100% Polyketone | 3:1 | 2:2 | 1:3 | 100% Wax |
| Tensile Strength, lb./sq. in. | 155 | 201 | 140 | 147 | 71 |
| Shore Durometer Hardness | 71 | 76 | 74 | 74 | 49 |

These results show that the compositions of blended polyketone and wax are harder than either component and are also stronger in one case. Even the blend high in paraffin has a tensile strength very close to that of the polyketone.

Example V

The polyketone of Example III was melt blended in various proportions with a highly refined paraffin wax having a melting point of 133–135° F. Even at low concentrations of polyketone, the blends showed unexpectedly good hardness and flexural strength.

| Property | Polyketone/Wax Ratio | | | | |
|---|---|---|---|---|---|
| | 100% Polyketone | 1:1 | 1:3 | 1:9 | 100% Wax |
| Flexural Strength, lb./sq. in. | 605 | 437 | 381 | 300 | 115 |
| Stiffness, lb./sq. in. | 4,953 | 14,886 | 18,162 | | 8,972 |
| Shore Durometer Hardness | 88 | 79 | 74 | 69 | 49 |

These results show that the flexural strength of the 1:9 blend is nearly three times as high as that of paraffin wax alone although this blend contains nine times as much paraffin wax as polyketone. The hardness of this 1:9 blend is closer to that of the pure polyketone than to that of the wax. There is a great increase in stiffness of the intermediate blends over that of either component.

Example VI

The paraffin wax used in Example V was melt blended in various proportions with a polyketone having an E/CO mole ratio of 11:1, a melt viscosity of 1000 poises at 125° C. and a melting point of 53–99° C. and a molecular weight of 3980.

Properties of these blends were found to be as follows:

| Property | Polyketone/Wax Ratio | | | | |
|---|---|---|---|---|---|
| | 100% Polyketone | 1:1 | 1:3 | 1:9 | 100% Wax |
| Flexural Strength, lb./sq. in. | 673 | 600 | 460 | 352 | 115 |
| Stiffness, lb./sq. in. | 6,292 | 16,820 | 24,226 | 11,755 | 8,972 |
| Shore Durometer Hardness | 87 | 81 | 74 | 57 | 49 |

These results show that the blends of polyketone and wax have hardness and flexural strength much closer to corresponding values of the polyketone than to those of the wax. The stiffness of the blends is also much higher than that of either component.

Example VII

A wax melt containing 2 parts of the ethylene/carbon monoxide polymeric polyketone of Example IV, 1 part polyisobutylene and 17 parts paraffin wax was coated on overprint label stock as a melt. The coating was glossy, flexible, did not strike through the paper, and had fair heat sealability.

Example VIII

The wax-polyketone composition of Example XIII was melt coated on paper. The gloss of the coated paper was intentionally dulled by scraping with the edge of a knife. By buffing the dulled surface with a cloth, it was restored to its original gloss.

The same composition was dissolved in xylene and cooled to give a paste containing 50% solids. This paste was applied to leather, and after the solvent had evaporated the polyketone/wax film was buffed to a high gloss.

Example IX

Carbon steel panels treated with a polyketone/paraffin wax blend and with recognized rustproofing agents were subjected to outdoor exposure. Coatings were applied to the metal by flooding with a 15% solution of the agent in xylene and drying the panels in a vertical position. Panels were exposed at an angle of 45° to the vertical, facing south. The condition of these panels after such exposure is tabulated below:

| Treatment | Condition of Steel Panel [1] | | |
|---|---|---|---|
| | 8 days | 16 days | 26 days |
| None (control) | 0 | 0 | 0 |
| Lanolin | 8.5 | 5 | 3 |
| Polyketone/paraffin wax (1:1) | 10 | 9.7 | 7 |
| Paraffin wax | 7 | 0.5 | 0 |

[1] Scale for rating panels:
 10—no rusting
 9—very slight rusting
 7—bad rusting
 5—very bad rusting
 0—panel surface entirely rusted The polyketone used in this test was that used in Example IV. The blend with paraffin was made by stirring at a temperature ranging up to 140° C. for about an hour in a Waring Blendor.

Example X

A self-polishing floor wax emulsion was made from a 1:1 polyketone/carnauba wax melt blend. The polyketone used had an E/CO mole ratio of 9:1 and a melt viscosity of 33 poises at 125° C., and a molecular weight of 2700. The wax and polyketone were melted and stirred together. To 120 parts of the melt were added 10 parts of stearic acid and 15 parts of morpholine. Boiling water was stirred into the wax/polyketone mixture which itself was at a temperature of 90–100° C. Initially a water-in-oil emulsion was formed. With continued addition of water this inverted to an oil-in-water emulsion. Six hundred fifty-eight parts of product were obtained.

This emulsion was applied to linoleum. It dried to a glossy finish which was slightly duller than that obtained from a similar emulsion made entirely from carnauba wax. Slight buffing of the polyketone/wax film gave a very high gloss. The coating showed no tendency to be spotted when drops of water stood on it for several minutes and were then wiped off.

Example XI

Paraffin wax was melt-blended with polyketones and with other commercial products used for improving the properties of paraffin. The blends were coated on white kraft paper, and the characteristics of the coated sheet were determined. In each case the melt blend contained equal parts of paraffin wax and modifier.

| 1:1 Paraffin Wax and Modifier as Indicated | Properties of Coated Sheet | | | |
|---|---|---|---|---|
| | Gloss | Heat Sealability | Flexibility of Coating | Penetration of Coating into Base Sheet |
| White Utahwax (domestic ozokerite) | None | None | Poor | Complete. |
| Microcrystalline Wax | do | do | do | Do. |
| White Ozokerite | do | do | do | Do. |
| Opalwax | do | do | do | Do. |
| Bleached Montan Wax | do | do | do | Do. |
| Ethylene polymer B [1] | High | do | Very good | None. |
| Ethylene polymer C [2] | Moderate | do | do | Do. |

[1] Molecular weight 16,000.  [2] Molecular weight 12,500.

| 1:1 Paraffin Wax and Modifier as Indicated | Properties of Coated Sheet | | | |
|---|---|---|---|---|
| | Gloss | Heat Sealability | Flexibility of Coating | Penetration of Coating into Base Sheet |
| Ethylene polymer D [1] | Low | Good | Good | Slight. |
| Polyketone A | High | do | Very good | None. |
| Polyketone B | Moderate | do | Good | Do. |
| Polyketone C | High | do | do | Do. |

[1] Molecular weight 9,000.

Polyketone A had an E/CO mole ratio of 6.5:1 and was somewhat crosslinked; polyketone B had an E/CO mole ratio of 6.7:1 and was also somewhat crosslinked. Polyketone C had an E/CO mole ratio of 7:1 and a molecular weight of 2900.

Penetration of the coating into the base sheet is objectionable as excessive amounts of the coating are thereby used in obtaining a continuous surface deposit.

These results clearly show that the polyketones are superior modifiers for paraffin wax. Although other materials may improve some properties, the polyketones improve all the four properties examined and tabulated above. Their effect on heat sealability is especially good.

*Example XII*

A paste polish was prepared from an ethylene/carbon monoxide polymeric polyketone having an ethylene/carbon monoxide mole ratio of 25.3:1, a molecular weight of 2170 and a melting range of 104–118° C. The polish was made by blending 7½ parts polyketone, 5½ parts paraffin wax and 35½ parts mineral spirits at high temperature. When the mixture was cooled, a cloudy solution was obtained at 75° C. It was poured into cans to harden. An excellent paste polish was obtained. It had good working properties and gave a glossy, smear-resistant polished surface.

*Example XIII*

The ethylene/carbon monoxide polymeric polyketone of Example IV, was blended with an equal weight of paraffin wax by melting the two materials together and stirring until homogeneous. The viscosity of the mixture was much lower than that of the original polyketone, making it much more suitable for the melt coating of paper.

Paper coated with this composition was found to have a high gloss and to be heat sealable to uncoated paper. The coating on the paper had good flexibility and did not crack when creased. Furthermore, the melt coating did not strike through the paper. Paper coated with paraffin wax alone lacked gloss and was not heat sealable; the coating also cracked when the paper was creased and penetrated the paper completely during the coating operation.

Although the examples illustrate blends of the ethylene/carbon monoxide polymeric polyketone with such waxes as paraffin wax, carnauba wax, and beeswax, it is to be understood that these polymeric polyketones may be blended with other waxes to improve their hardness, increase their toughness, raise their melting point, and decrease cost.

The compositions of this invention are useful for the coating of substrates such as wood, metal, paper, glass, plastics, textiles and the like to improve one or more properties such as gloss, stiffness, water-repellency, surface slip, etc. The application to these substrates may be by dipping, brushing, spraying, melt coating or by combination of any of these methods.

The compositions of this invention are especially useful in the coating of paper. In this application blends containing as much as 90% of the wax component can be used and such products are superior to products hitherto available in heat-sealability, flexibility, gloss, and color.

To the compositions there may be added, if desired, pigments, dyes, anti-oxidants, fillers, oils, natural and synthetic resins, asphalts, deflocculating agents, fire-retardants, fungicides, insecticides, and the like.

As many apparently widely different embodiments of this invention may be made without departing from the spirit and scope thereof, it is to be understood that this invention is not limited to the specific embodiments thereof except as defined in the appended claims.

I claim:

1. A composition comprising from 1 to 99 parts by weight of a wax and from 99 to 1 parts by weight of a polymeric polyketone obtained by polymerizing ethylene with carbon monoxide in which the mole ratio of ethylene to carbon monoxide is from 150:1 to 5:1.

2. An article containing a coating comprising from 1 to 99 parts by weight of a wax and from 99 to 1 parts by weight of a polymeric polyketone obtained by polymerizing ethylene with carbon monoxide in which the mole ratio of ethylene to carbon monoxide is from 150:1 to 5:1.

3. Paper containing a coating comprising from 1 to 99 parts by weight of a wax and from 99 to 1 parts by weight of a polymeric polyketone obtained by polymerizing ethylene with carbon monoxide in which the mole ratio of ethylene to carbon monoxide is from 150:1 to 5:1.

4. A composition comprising a blend of from 5 to 95 parts by weight of a wax and from 95 to 5 parts by weight of a polymeric polyketone obtained by polymerizing ethylene with carbon monoxide, the mole ratio of ethylene to carbon monoxide in said polymeric polyketone being from 150:1 to 5:1.

5. A composition as set forth in claim 4 in which said wax is paraffin wax.

6. A substrate containing a coating comprising the composition set forth in claim 4.

7. A composition comprising a blend, as set forth in claim 4, in which the mole ratio of ethylene to carbon monoxide in said polymeric polyketone is from 8:1 to 50:1 and the molecular weight of said polymeric polyketone is at least 1000.

8. A composition comprising a blend of from 1 to 9 parts by weight of a wax and from 3 to 1 parts by weight of a polymeric polyketone obtained by polymerizing ethylene with carbon monoxide, the mole ratio of ethylene to carbon monoxide in said polymeric polyketone being from 8:1 to 50:1 and the molecular weight at least 1000.

9. A substrate containing a coating comprising the composition set forth in claim 8.

10. Paper containing a coating comprising the composition set forth in claim 8.

11. A composition comprising a blend of equal parts by weight of a wax and a polymeric polyketone obtained by polymerizing ethylene with carbon monoxide, the mole ratio of ethylene to carbon monoxide in said polymeric polyketone being from 8:1 to 50:1 and the molecular weight at least 1000.

12. A substrate containing a coating comprising the composition set forth in claim 11.

13. Paper containing a coating comprising the composition set forth in claim 11.

HARVEY H. HOEHN.

No references cited.